United States Patent
Hung et al.

(10) Patent No.: US 11,656,644 B2
(45) Date of Patent: May 23, 2023

(54) CONTROL CIRCUIT OF POWER CONVERTER AND REFERENCE VOLTAGE ADJUSTING METHOD THEREOF

(71) Applicant: uPI semiconductor corp., Zhubei (TW)

(72) Inventors: Wei-Hsiu Hung, Zhubei (TW); Min-Rui Lai, Zhubei (TW); Chih-Lien Chang, Zhubei (TW)

(73) Assignee: UPI SEMICONDUCTOR CORP., Zhubei (TW)

( * ) Notice: Subject to any disclaimer, the term of this patent is extended or adjusted under 35 U.S.C. 154(b) by 8 days.

(21) Appl. No.: 17/396,823

(22) Filed: Aug. 9, 2021

(65) Prior Publication Data
US 2022/0050487 A1    Feb. 17, 2022

(51) Int. Cl.
*G05F 1/575* (2006.01)
(52) U.S. Cl.
CPC .................. *G05F 1/575* (2013.01)
(58) Field of Classification Search
CPC ........ G05F 1/565; G05F 1/1569; G05F 1/571; G05F 1/575
See application file for complete search history.

(56) References Cited

U.S. PATENT DOCUMENTS

| | | | |
|---|---|---|---|
| 8,072,200 B1 | 12/2011 | Qiu et al. | |
| 10,044,273 B2 | 8/2018 | Gherghescu et al. | |
| 10,243,460 B2 | 3/2019 | Babazadeh | |
| 10,680,511 B2 | 6/2020 | Chang et al. | |
| 2006/0043955 A1* | 3/2006 | Hung | H02M 3/158 323/283 |
| 2020/0027957 A1* | 1/2020 | Umemoto | H01L 29/49 |
| 2020/0228010 A1* | 7/2020 | Wiktor | H02M 3/156 |

* cited by examiner

*Primary Examiner* — Nguyen Tran
(74) *Attorney, Agent, or Firm* — McClure, Qualey & Rodack, LLP

(57) ABSTRACT

A control circuit of a power converter includes a first sensing circuit, a reference voltage generation circuit, an error amplifying circuit and a PWM circuit. The first sensing circuit, coupled to a first output circuit, provides a first current sensing signal. The reference voltage generation circuit, coupled to the first sensing circuit, provides a reference voltage according to the first current sensing signal. The error amplifying circuit, coupled to the reference voltage generation circuit, receives the reference voltage and an output feedback voltage of the power converter to provide an error amplifying signal. The PWM circuit, coupled between the error amplifying circuit and the first output circuit, receives the error amplifying signal and provides a control signal to control the first output circuit. The reference voltage generation circuit further receives the error amplifying signal and adjusts the reference voltage it generates according to the error amplifying signal.

18 Claims, 10 Drawing Sheets

CONTROL CIRCUIT OF POWER CONVERTER AND REFERENCE VOLTAGE ADJUSTING METHOD THEREOF

BACKGROUND OF THE INVENTION

1. Field of the Invention

The invention relates to a power converter; in particular, to a control circuit of a power converter and a reference voltage adjusting method thereof.

2. Description of the Prior Art

In a general power converting circuit, in order to reduce the amplitude of output voltage variation during continuous load increasing and decreasing, a reference voltage variation amount proportional to the output current is usually designated to change the reference voltage for feedback control, which is called adaptive voltage positioning (AVP) and the ratio is called load-line. Since the load-line is a proportional relationship between the voltage (the reference voltage variation) and the current (the output current), it is expressed in a form of resistor, marked as RLL.

In a known AVP circuit, if a fixed load-line setting is used, it means that the same reference voltage variation amount is provided under the same output current, and the output current (the inductor current) of a power stage operating at low input voltage will rise and fall slower than a power stage operating at high input voltage. When load increasing and decreasing occurs at the load coupled to the power converter, the swing of the total current within a fixed time is small, which makes the reference voltage variation amount in the fixed time less than an expected variation amount, and the control loop will over-react to make the amplitude of the output voltage variation of the power converter too large to provide stable output.

In other words, when the load-line setting of high input voltage is directly applied to the condition of low input voltage, since the output current fails to keep up with the variation of load increasing, the reference voltage variation amount is insufficient and the control loop over-reacts, causing the peak-to-peak value of output voltage to increase and cannot provide stable output. This condition needs to be improved.

SUMMARY OF THE INVENTION

Therefore, the invention provides a control circuit of a power converter and a reference voltage adjusting method thereof to solve the above-mentioned problems in the prior art.

An embodiment of the invention is a control circuit of a power converter. In this embodiment, the control circuit includes a first sensing circuit, a reference voltage generation circuit, an error amplifying circuit and a pulse-width modulation (PWM) circuit. The first sensing circuit is coupled to a first output circuit to provide a first current sensing signal. The reference voltage generation circuit is coupled to the first sensing circuit and provides a reference voltage according to the first current sensing signal. The error amplifying circuit is coupled to the reference voltage generation circuit and receives the reference voltage and an output feedback voltage of the power converter to provide an error amplification signal. The PWM circuit is coupled between the error amplifying circuit and the first output circuit and receives the error amplification signal and provides a control signal to control the first output circuit. The reference voltage generation circuit also receives the error amplification signal and adjusts the reference voltage according to the error amplification signal.

In an embodiment of the invention, the reference voltage generation circuit further includes a comparing circuit coupled to the error amplifying circuit and configured to compare the error amplifying signal with a threshold value to generate a comparing result.

In an embodiment of the invention, when a load coupled to the power converter is increased, the reference voltage generation circuit changes a ratio between the reference voltage and an output current provided by the output circuit from a default value to an adjusted value according to the error amplification signal.

In an embodiment of the invention, when the load coupled to the power converter is stable, the reference voltage generation circuit gradually restores the ratio from the adjusted value to the default value.

In an embodiment of the invention, the adjusted value is related to an input voltage of the power converter.

In an embodiment of the invention, the reference voltage generation circuit includes an adjusting circuit and a voltage generation circuit, the adjusting circuit is coupled to the first sensing circuit and an output terminal of the error amplifying circuit respectively, and the voltage generation circuit is coupled to the adjusting circuit and an input terminal of the error amplifying circuit respectively and generates the reference voltage.

In an embodiment of the invention, the adjusting circuit includes a comparing circuit and a bidirectional counting circuit, an input terminal of the comparing circuit is coupled to the output terminal of the error amplifying circuit, the bidirectional counting circuit is coupled to an output terminal of the comparing circuit and determines and adjusts a variation of the reference voltage according to a comparing signal provided by the comparing circuit.

In an embodiment of the invention, the reference voltage generation circuit includes an analog-digital converting circuit and a digital voltage generation circuit, the analog-digital converting circuit is coupled to the first sensing circuit, and the digital voltage generation circuit is coupled between the analog-digital converting circuit and the error amplifying circuit, the analog-digital converting circuit converts the first current sensing signal into a digital sensing value, and the digital voltage generation circuit generates a digital reference value representing the reference voltage according to the digital sensing value.

In an embodiment of the invention, the digital voltage generation circuit selectively changes a variation of the digital reference value from a default value to an adjusted value according to whether the error amplification signal is higher than a threshold value.

In an embodiment of the invention, the control circuit is further coupled to a second output circuit, the control circuit further includes a second sensing circuit, coupled between the second output circuit and the reference voltage generation circuit and configured to provide a second current sensing signal to the reference voltage generation circuit, the reference voltage generation circuit generates the reference voltage according to the first current sensing signal and the second current sensing signal.

Another embodiment of the invention is a reference voltage adjusting method. In this embodiment, the reference voltage adjusting method is applied to a control circuit of a power converter. The control circuit is coupled to a first output circuit. The reference voltage adjusting method includes steps of: (a) providing a first current sensing signal; (b) providing a reference voltage according to the first current sensing signal; (c) receiving the reference voltage and an output feedback voltage to provide an error amplifying signal; (d) receiving the error amplifying signal and providing a control signal to control the first output circuit; and (e) adjusting the reference voltage according to the error amplifying signal.

In an embodiment of the invention, the reference voltage adjusting method further includes: (f) comparing the error amplifying signal and a threshold value to generate a comparing result.

In an embodiment of the invention, when a load coupled to the power converter is increased, the reference voltage adjusting method changes a variation of the reference voltage from a default value to an adjusted value according to the error amplification signal.

In an embodiment of the invention, when the load coupled to the power converter is stable, the reference voltage adjusting method gradually restores the ratio from the adjusted value to the default value.

In an embodiment of the invention, the adjusted value is related to an input voltage of the power converter.

In an embodiment of the invention, the reference voltage adjusting method further includes: converting the first current sensing signal into a digital sensing value, and generating a digital reference value representing the reference voltage according to the digital sensing value.

In an embodiment of the invention, the reference voltage adjusting method further includes: selectively changing a variation of the digital reference value from a default value to an adjusted value according to whether the error amplification signal is higher than a threshold value.

In an embodiment of the invention, the step (a) further includes: providing a second current sensing signal and the step (b) further includes: generating the reference voltage according to the first current sensing signal and the second current sensing signal.

Compared to the prior art, the control circuit of the power converter and the reference voltage adjusting method thereof in the invention first determine whether the default load-line is sufficient according to the error amplification signal when load increases, and when the default reference voltage variation is not enough (that is, when the error amplification signal is greater than the threshold value), the value of the load-line is increased to increase the amount of reference voltage variation and is then gradually adjusted back to the default load-line according to the comparing result of the error amplification signal and the threshold value. The control circuit of the power converter and the reference voltage adjusting method thereof have the following advantages/functions:

(1) The reference voltage variation can be adjusted appropriately according to the input voltage and load current to reduce the peak-to-peak difference of the output voltage during fast load increasing and unloading under different input voltage applications, so it can effectively improve the output stability.

(2) The reference voltage variation can gradually restore to the default value after the load increasing and unloading is completed without affecting the output voltage of the long-term load increasing.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

Figure 1:
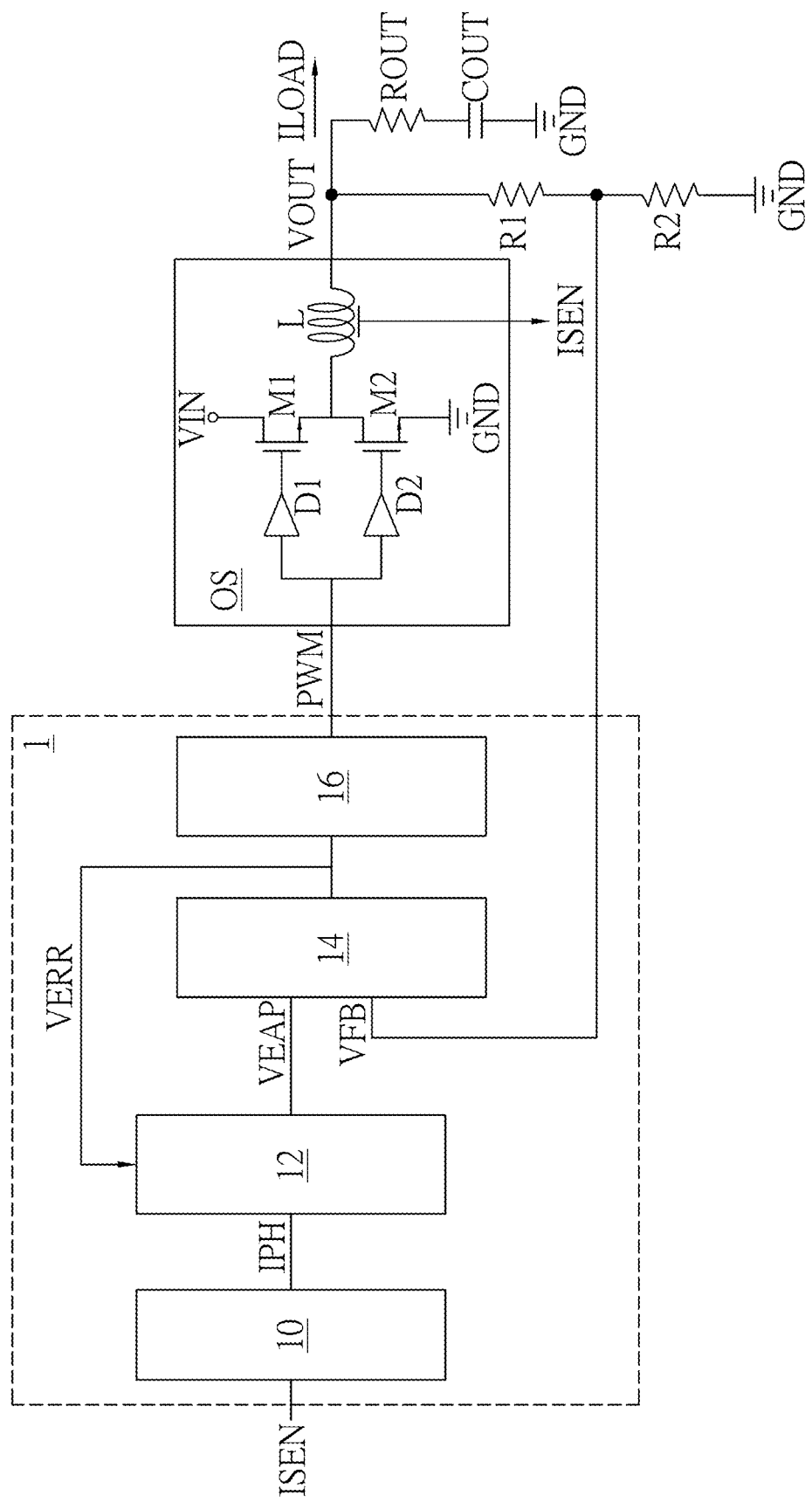
FIG. 1 is a schematic diagram of a control circuit of a power converter in an embodiment of the invention.

Exemplary embodiments of the invention are referenced in detail now, and examples of the exemplary embodiments are illustrated in the drawings. Further, the same or similar reference numerals of the components/components in the drawings and the detailed description of the invention are used on behalf of the same or similar parts.

An embodiment of the invention is a control circuit of a power converter. In this embodiment, the control circuit can be applied to the single-phase converter or the multi-phase power converter depending on actual requirements.

Please refer to FIG. 1. FIG. 1 is a schematic diagram of the control circuit of the single-phase power converter. As shown in FIG. 1, the control circuit 1 is coupled to the output circuit OS. The resistors R1 and R2 are coupled in series between the output circuit OS and the ground terminal GND. The output resistor ROUT and the output capacitor COUT are coupled in series between the output circuit OS and the ground terminal GND. The control circuit 1 is also coupled between the resistors R1 and R2.

The output circuit OS includes driving circuits D1~D2, power switches M1~M2 and an output inductor L. The driving circuit D1 is coupled between the control circuit 1 and a control terminal of the power switch M1. The driving circuit D2 is coupled between the control circuit 1 and a control terminal of the power switch M2. The power switches M1 and M2 are coupled in series with each other and the power switch M2 is coupled to the ground terminal GND. One terminal of the output inductor L is coupled between the power switches M1 and M2. The other terminal of the output inductor L has an output voltage VOUT and is coupled to the resistor R1 and the output resistor (load) ROUT respectively. And, a load current ILOAD flows through the resistor ROUT.

The control circuit 1 includes a sensing circuit 10, a reference voltage generation circuit 12, an error amplifying circuit 14 and a pulse-width modulation (PWM) circuit 16. The sensing circuit 10 is coupled to the output inductor L in the output circuit OS. The reference voltage generation circuit 12 is coupled to the sensing circuit 10. The input terminal of the error amplifying circuit 14 is coupled to the reference voltage generation circuit 12 and between the resistors R1 and R2 respectively and the output terminal of the error amplifying circuit 14 is coupled to the PWM circuit 16 and the reference voltage generation circuit 12 respectively. The PWM circuit 16 is coupled between the error amplifying circuit 14 and the output circuit OS.

The sensing circuit 10 is used to sense the inductor current flowing through the output inductor L of the output circuit OS to obtain the sensing signal ISEN, and accordingly provide the current sensing signal IPH to the reference voltage generation circuit 12. The reference voltage generation circuit 12 is used for providing the reference voltage VEAP to the error amplifying circuit 14 according to the current sensing signal IPH. It should be noted that the sensing signal ISEN is usually a voltage signal, which can be obtained by using a circuit such as a DC resistor (DCR) or a resistance element to sense the inductor current flowing through the output inductor L, but not limited to this.

When the error amplifying circuit 14 receives the reference voltage VEAP from the reference voltage generation circuit 12 and the output feedback voltage VFB between the resistors R1 and R2, the error amplifying circuit 14 will generate an error amplification signal VERR according to the reference voltage VEAP and the output feedback voltage VFB and output the error amplification signal VERR to the PWM circuit 16 and the reference voltage generation circuit 12.

When the PWM circuit 16 receives the error amplification signal VERR, the PWM circuit 16 will generate a control signal PWM to the output circuit OS according to the error amplification signal VERR to control the operation of the output circuit OS.

When the reference voltage generation circuit 12 receives the error amplification signal VERR, the reference voltage generation circuit 12 will adjust the reference voltage VEAP generated by the reference voltage generation circuit 12 according to the error amplification signal VERR. In practical applications, the reference voltage generation circuit 12 can adjust the variation of the reference voltage VEAP according to the error amplification signal VERR. For example, the variation of the reference voltage VEAP is adjusted according to the comparing result of the error amplification signal VERR and the threshold value, but not limited to this.

Figure 2:
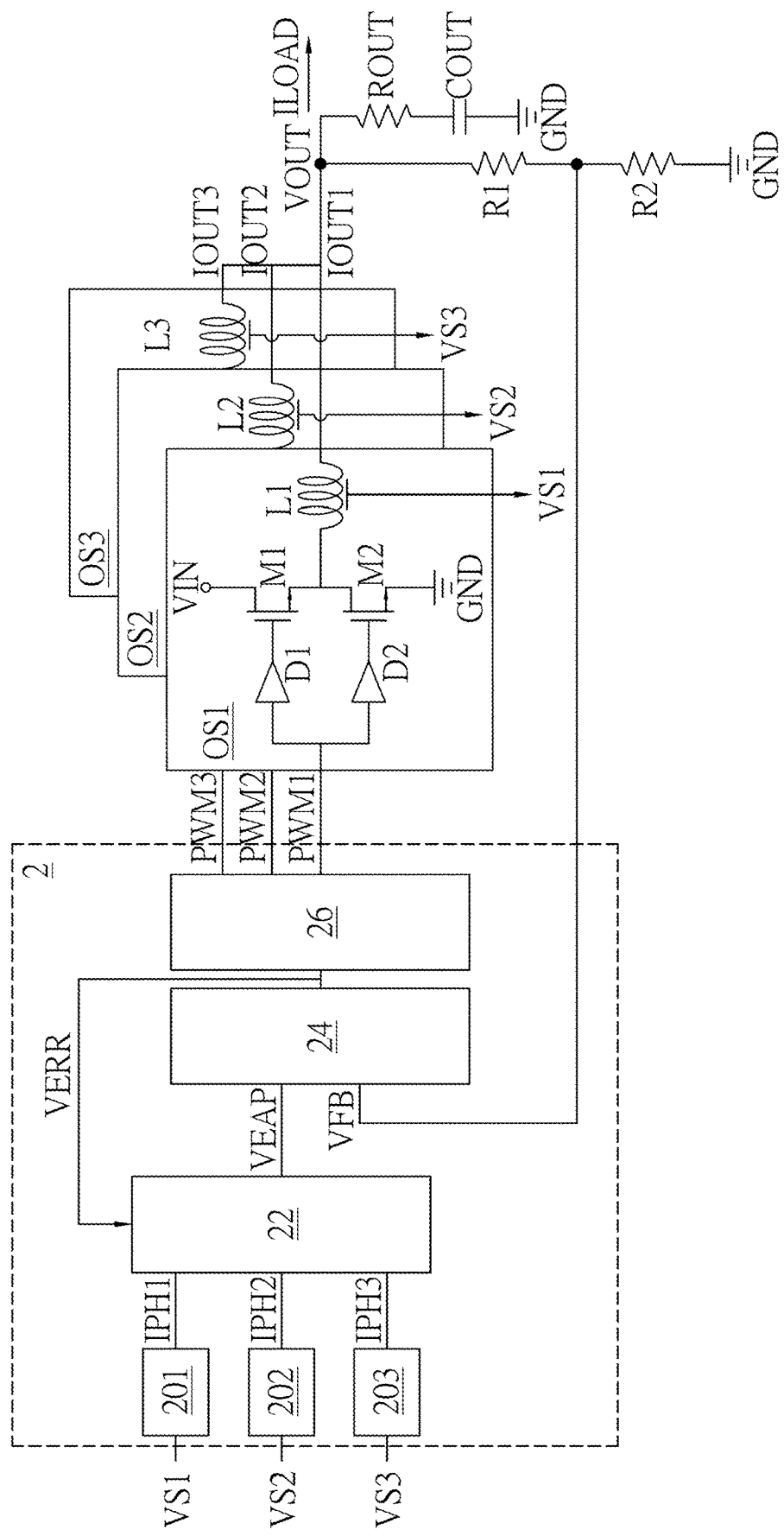
FIG. 2 is a schematic diagram of a control circuit of a power converter in another embodiment of the invention.

Please refer to FIG. 2. FIG. 2 is a schematic diagram of the control circuit of the multi-phase power converter. The only difference of the embodiment shown in FIG. 2 from that shown in FIG. 1 is:

(1) The control circuit 2 is coupled to a plurality of output circuits OS1~OS3 respectively. The circuit structure of the output circuits OS2~OS3 is the same as that of the output circuit OS1.

(2) The control circuit 2 includes a plurality of sensing circuits 201~203. The sensing circuits 201~203 are coupled to the output inductors L1~L3 of the output circuits OS1~OS3 respectively. The reference voltage generation circuit 22 is coupled to the sensing circuits 201~203 respectively. Other details are the same as the embodiment in FIG. 1 and will not be repeated here.

The sensing circuits 201~203 sense the sensing signals VS1~VS3 related to the output currents IOUT1~IOUT3 flowing through the output inductors L1~L3 of the output circuits OS1~OS3 respectively and accordingly provide current sensing signals IPH1~IPH3 to the reference voltage generation circuit 22 respectively. The reference voltage generation circuit 22 provides the reference voltage VEAP to the error amplifying circuit 24 according to the current sensing signals IPH1~IPH3. In this embodiment, the means for obtaining the sensing signals VS1~VS3 from the output inductors L1~L3 can be a DCR sensing circuit, and the sensing signals VS1~VS3 sensed by it are voltage signals, but not limited to this.

Figure 3:
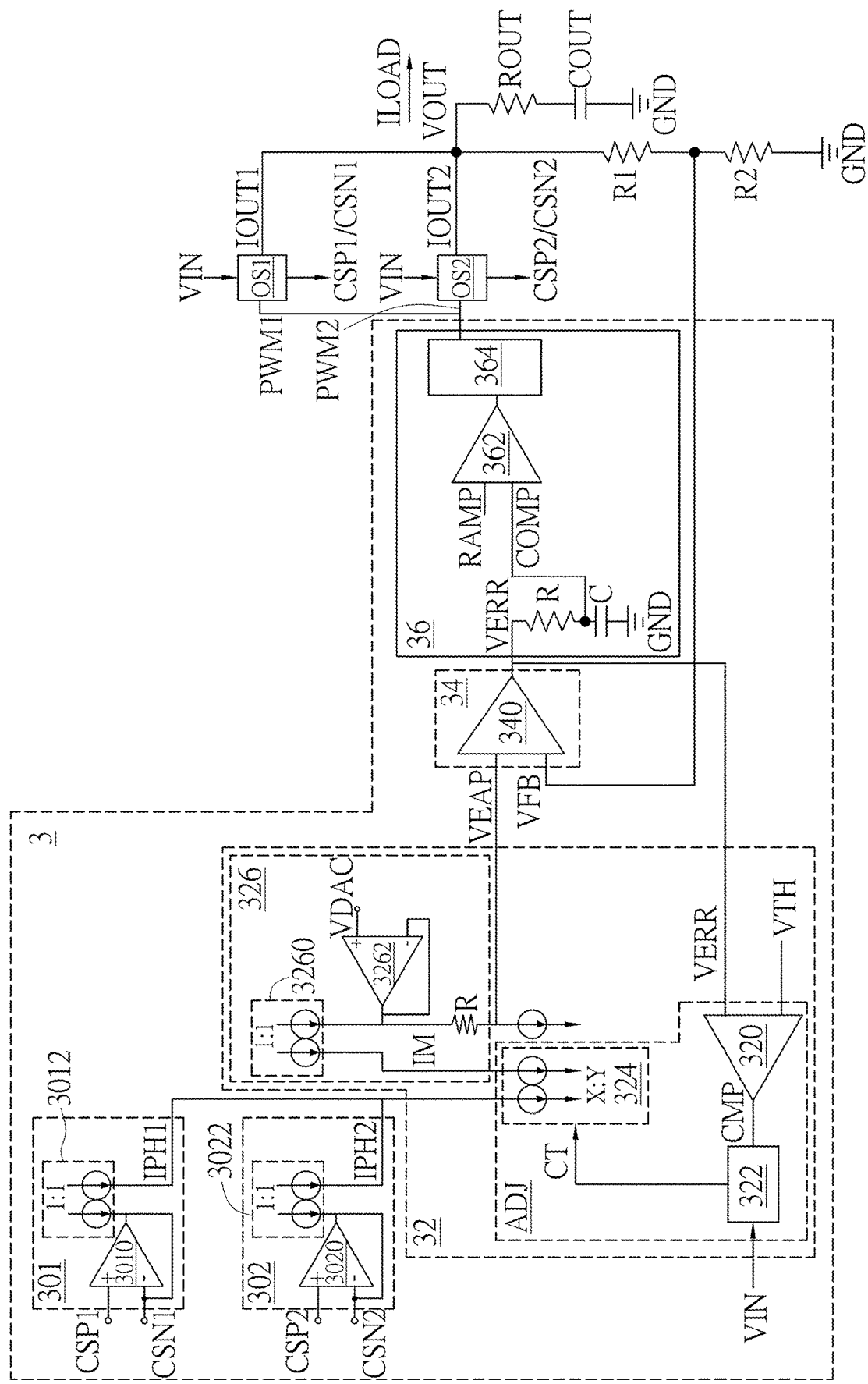
FIG. 3 is a schematic diagram of a control circuit of an analog power converter.
Figure 4:
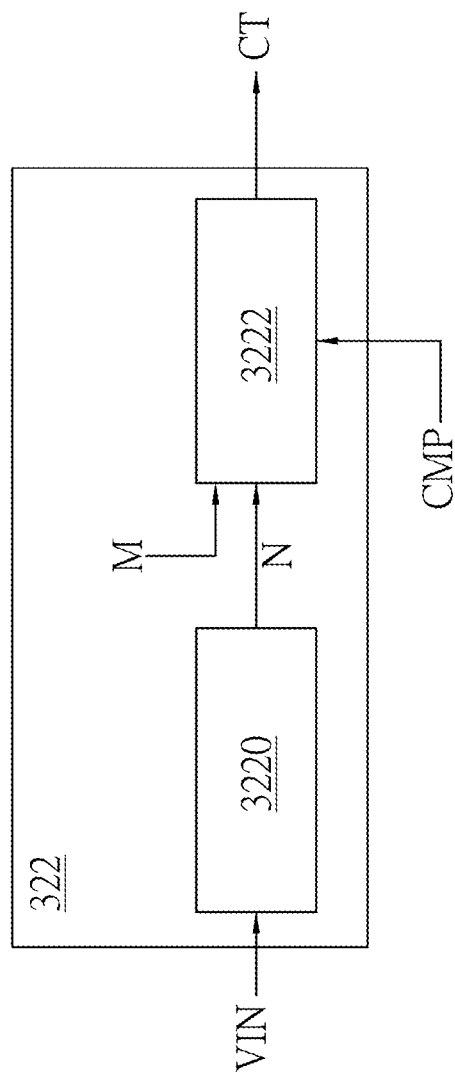
FIG. 4 is an embodiment of the bidirectional counting circuit in FIG. 3.

Please refer to FIG. 3 and FIG. 4. FIG. 3 is a schematic diagram of the control circuit 3 of the multi-phase analog power converter. FIG. 4 shows the bidirectional counting circuit 322 in the reference voltage generation circuit 32. As shown in FIG. 3, the control circuit 3 of the multi-phase analog power converter obtains the sensing signals CSP1~CSP2/CSN1~CSN2 from the output circuits OS1~OS2. Other external circuits and coupling relationships are the same as those in FIG. 2, so it will not be repeated here.

The control circuit 3 includes sensing circuits 301~302, a reference voltage generation circuit 32, an error amplifying circuit 34 and a PWM circuit 36. The sensing circuits 301~302 are coupled to the output circuits OS1~OS2 respectively. The reference voltage generation circuit 32 is coupled to the sensing circuits 301~302 respectively. The input terminal of the error amplifying circuit 34 is coupled to the reference voltage generation circuit 32 and between the resistors R1 and R2 respectively, and the output terminal of the error amplifying circuit 34 is coupled to the PWM circuit 36 and the reference voltage generation circuit 32 respectively. The PWM circuit 36 is coupled between the error amplifying circuit 34 and the output circuits OS1~OS2.

The sensing circuit 301 includes an amplifier 3010 and a current mirror 3012. The two input terminals of the amplifier 3010 receive the sensing signals CSP1/CSN1 related to the output current IOUT1 of the output circuit OS1 and output the comparing result to control the current mirror 3012 to (1:1) generate the current sensing signal IPH1 to the reference voltage generation circuit 32.

Similarly, the sensing circuit 302 includes an amplifier 3020 and a current mirror 3022. The two input terminals of the amplifier 3020 receive the sensing signals CSP2/CSN2 related to the output current IOUT2 of the output circuit OS2 and output the comparing result to control the current mirror 3022 to (1:1) generate the current sensing signal IPH2 to the reference voltage generation circuit 32. It should be noted that, in this embodiment, the sensing circuits 301~302 obtain the sensing signals CSP/CSN through an external DCR sensing circuit (not shown in the figure), but not limited to this.

The reference voltage generation circuit 32 includes a comparing circuit 320, a bidirectional counting circuit 322, a current mirror 324 and a voltage generation circuit 326. The input terminal of the comparing circuit 320 is coupled to the output terminal of the error amplifying circuit 34 and the threshold value VTH respectively. The bidirectional counting circuit 322 is coupled between the comparing circuit 320 and the current mirror 324. The current mirror 324 is coupled to the sensing circuits 301~302, the bidirectional counting circuit 322 and the voltage generation circuit 326 respectively. The voltage generation circuit 326 is coupled to the current mirror 324 and the input terminal of the error amplifying circuit 34 respectively. The comparing circuit 320, the bidirectional counting circuit 322 and the current mirror 324 can also be collectively referred to as the adjusting circuit ADJ, but not limited to this.

As shown in FIG. 4, the bidirectional counting circuit 322 includes a converter 3220 and a bidirectional counter 3222. The converter 3220 is coupled to the bidirectional counter 3222. The converter 3220 generates an initial adjusting value N of the ratio of the variation of the reference voltage VEAP to the output current (IOUT1+IOUT2) (hereinafter referred to as the load-line (RLL)) according to the input voltage VIN received by the output circuits OS1~OS2. The bidirectional counter 3222 receives the initial adjusting value N, the default value M of the load-line (RLL) and the comparing signal CMP provided by the comparing circuit 320 respectively, and the bidirectional counter 3222 accordingly generates a counting signal CT to the current mirror 324.

For example, when the comparing result of the comparing circuit 320 is that the error amplification signal VERR is higher than the threshold value VTH, it means that the load coupled to the power converter is increased. At this time, the bidirectional counter 3222 will change the load-line (RLL) from the original default value M to the adjusted value (M+N) according to the comparing signal CMP. In other words, the adjusted value (M+N) is the default value M plus the initial adjusted value N, but not limited to this.

In fact, the initial adjusted value N is not only related to the input voltage VIN, but also related to the on-time TON and the minimum off-time TOFF(min) in the control signals PWM1~PWM2 generated by the PWM logic circuit 364, but not limited to this.

After a period of time, when the comparing result of the error amplification signal VERR and the threshold value VTH compared by the comparing circuit 320 starts to change to that the error amplification signal VERR is lower than the threshold value VTH, it means that the load coupled to the power converter become stable. At this time, the bidirectional counter 3222 will gradually restore the load-line (RLL) from the adjusted value (M+N) to the default value M according to the comparison signal CMP.

When the current mirror 324 receives the current sensing signals IPH1~IPH2 provided by the sensing circuits 301~302, the current mirror 324 correspondingly generates the current signals IM to the voltage generation circuit 326 in accordance with a current ratio X:Y according to the current sensing signals IPH1~IPH2. In this embodiment, the magnification of the current mirror 324 is the value of the load-line (RLL).

The voltage generation circuit 326 includes a current mirror 3260, a voltage follower 3262 and a resistor R. The current mirror 3260 is coupled to the current mirror 324 of the reference voltage generation circuit 32 and the resistor R respectively. The output terminal of the voltage follower 3262 is coupled between the current mirror 3260 and the resistor R. One input terminal + of the voltage follower 3262 is coupled to the default voltage VDAC and the other input terminal − of the voltage follower 3262 is coupled to its output terminal.

When the current mirror 3260 receives the current signal IM provided by the current mirror 324 of the reference voltage generation circuit 32, the current mirror 3260 transmits the current signal IM to the resistor R according to a current ratio of 1:1. Since the voltage follower 3262 will limit the voltage at one terminal of the resistor R to the default voltage VDAC, when the current signal IM flows through the resistor R, the voltage at the other terminal of the resistor R is equal to VDAC−(IM*R) and is provided as the reference voltage VEAP to the error amplifying circuit 34. In other words, once the current signal IM provided by the current mirror 324 of the reference voltage generation circuit 32 is changed, the reference voltage VEAP will also change accordingly.

The error amplifying circuit 34 includes an error amplifier 340. When one input terminal of the error amplifier 340 receives the reference voltage VEAP provided by the reference voltage generation circuit 32 and the other input terminal of the error amplifier 340 receives the output feedback voltage VFB related to the output voltage VOUT, the error amplifying circuit 34 will generate the error amplification signal VERR according to the reference voltage VEAP and the output feedback voltage VFB.

The PWM circuit 36 includes a resistor R, a capacitor C, a comparing circuit 362 and a PWM logic circuit 364. The resistor R and the capacitor C are coupled in series between an input terminal of the comparing circuit 362 and the ground terminal GND and are used as a low-pass filter (LPF) to filter the error amplification signal VERR provided by the error amplifying circuit 34 to generate a compensation signal COMP.

The comparing circuit 362 compares the compensation signal COMP with the ramp signal RAMP and provides a comparing signal to the PWM logic circuit 364 according to the comparing result. The PWM logic circuit 364 generates control signals PWM1~PWM2 to the output circuits OS1~OS2 according to the comparing signal to control the operation of the output circuits OS1~OS2.

In other words, the analog control circuit 3 can equivalently change the load-line (RLL) by dynamically adjusting the current ratio X:Y of the current mirror 324, and adjust the variation of the reference voltage through the current signal IM generated by it (that is, the default voltage VDAC−the reference voltage VEAP), so the effect of dynamically adjusting the reference voltage VEAP can be achieved.

Figure 5:
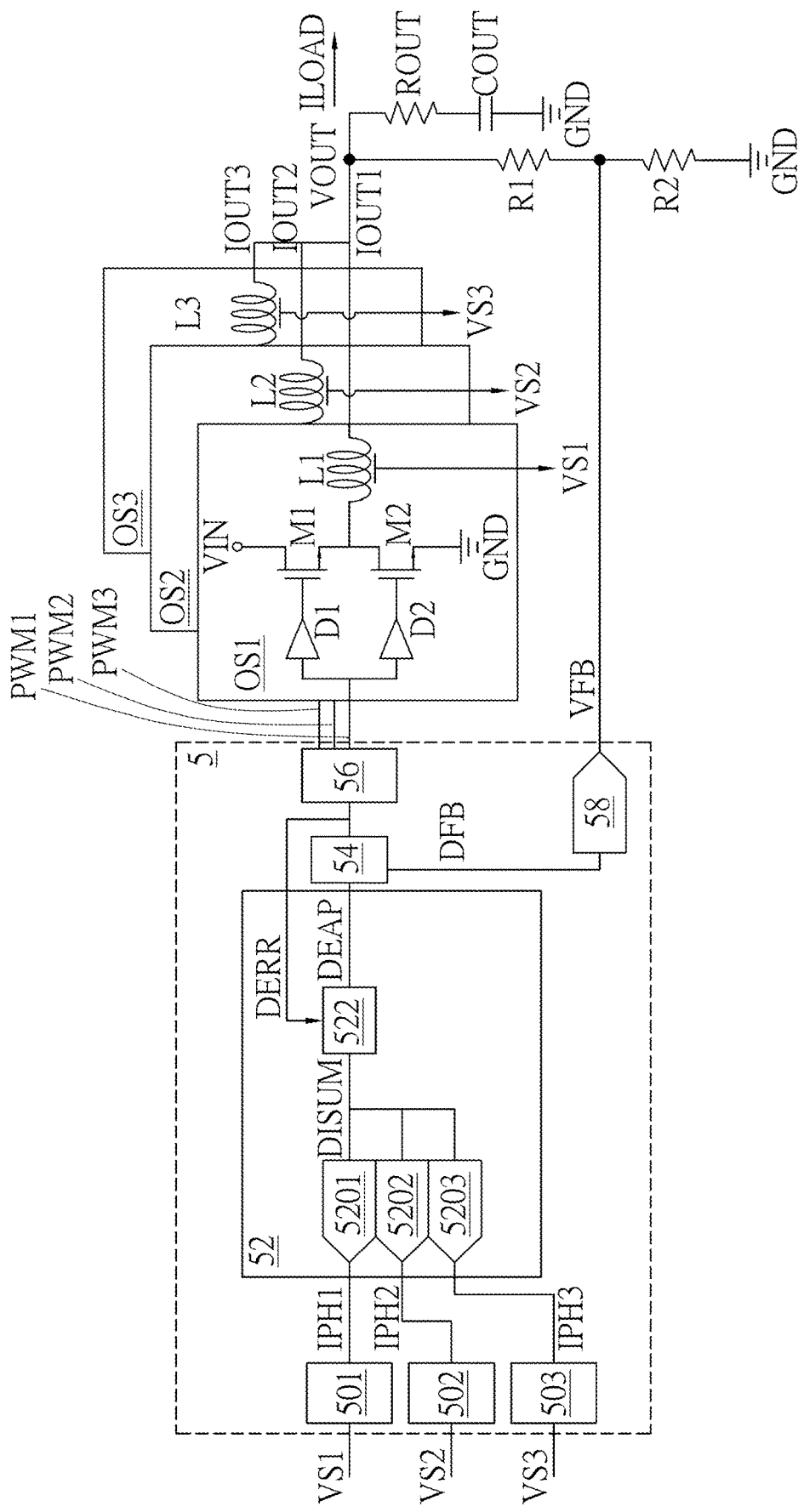
FIG. 5 is a schematic diagram of a control circuit of a digital power converter.

Please refer to FIG. 5. FIG. 5 is a schematic diagram of a multi-phase digital power converter. The difference of FIG. 5 from FIG. 3 is only that the control circuit 5 further includes an analog-to-digital converter 58 and the reference voltage generation circuit 52 is digital to provide a digital value representing the reference voltage. The analog-to-digital converter 58 is coupled to the error amplifying circuit 54 and between the resistors R1 and R2 respectively, and the rest are the same as in FIG. 3, so no further description is repeated here.

The reference voltage generation circuit 52 includes analog-to-digital converters 5201-5203 and a digital reference voltage generator 522. The analog-to-digital converters 5201~5203 are coupled between the sensing circuits 501~503 and the digital reference voltage generator 522 respectively. The digital reference voltage generator 522 is also coupled to the error amplifying circuit 54.

The analog-to-digital converters 5201~5203 convert the current sensing signals IPH1~IPH3 provided by the sensing circuits 501~503 to digital sensing values respectively, and then output a digital sum current signal DISUM to the digital reference voltage generator 522. The digital reference voltage generator 522 generates a digital reference value DEAP representing the reference voltage to the error amplifying circuit 54 according to the digital sum current signal DISUM. The analog-to-digital converter 58 converts the output feedback voltage VFB between the resistors R1 and R2 into a digital output feedback value DFB and outputs it to the error amplifying circuit 54.

When the error amplifying circuit 54 receives the digital reference value DEAP and the digital output feedback value DFB respectively, the error amplifying circuit 54 generates a digital error amplification signal DERR according to the digital reference value DEAP and the digital output feedback value DFB, and provides the digital error amplification signal DERR to the PWM circuit 56 and the digital reference voltage generator 522 respectively. The digital reference voltage generator 522 determines whether to increase the variation of the digital reference value DEAP from the original default value M to the adjusted value (M+N) according to whether the digital error amplification signal DERR is higher than the threshold value DTH.

In practical applications, the digital control circuit 5 can convert the error amplification signal into an adjusted value through a look-up table to directly generate a new digital reference value DEAP, but not limited to this.

Figure 6:
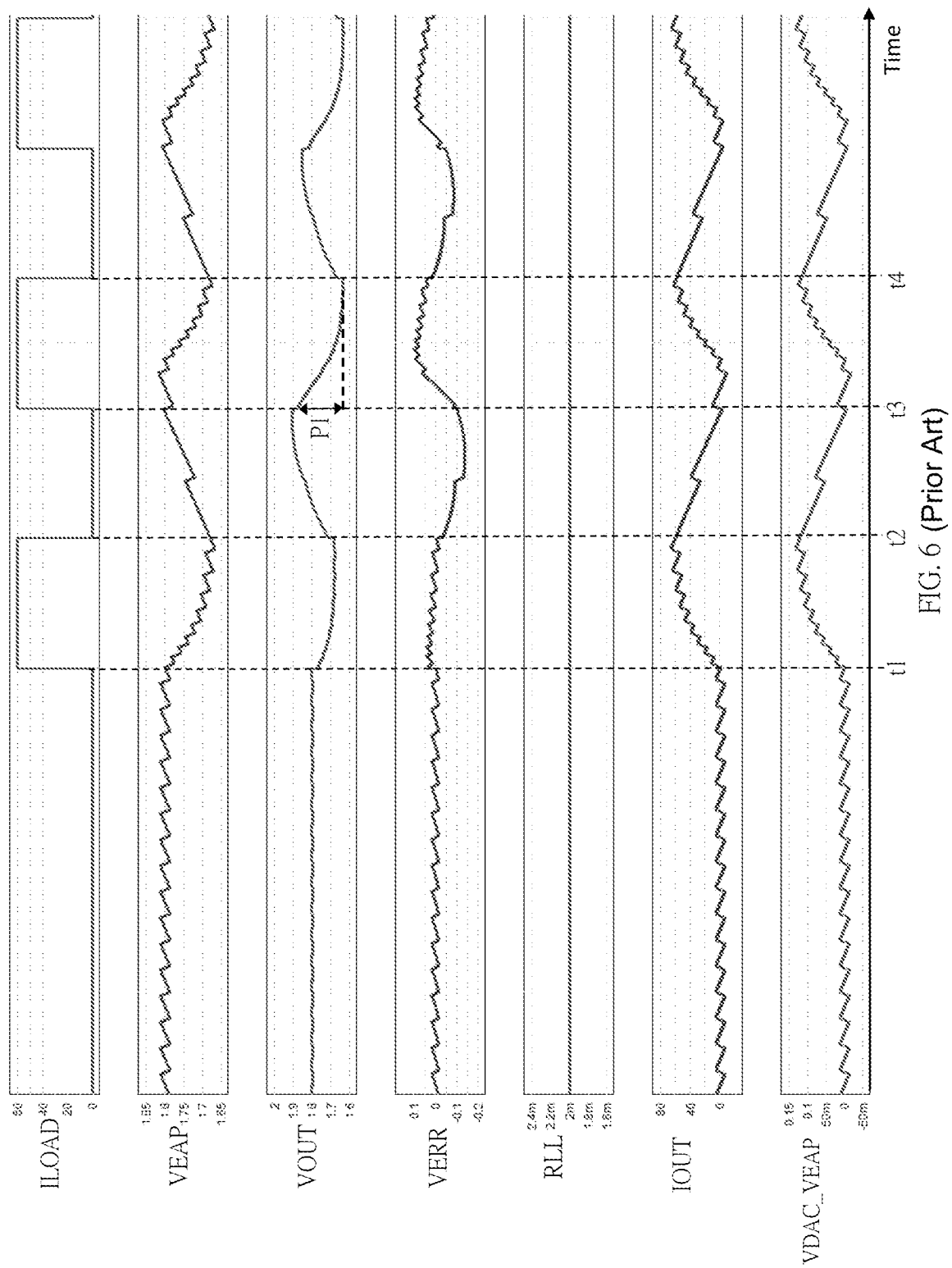
FIG. 6 and FIG. 7 are timing diagrams of the control circuit of the power converter of the prior art and the invention in continuous short-term load increasing respectively.
Figure 7:
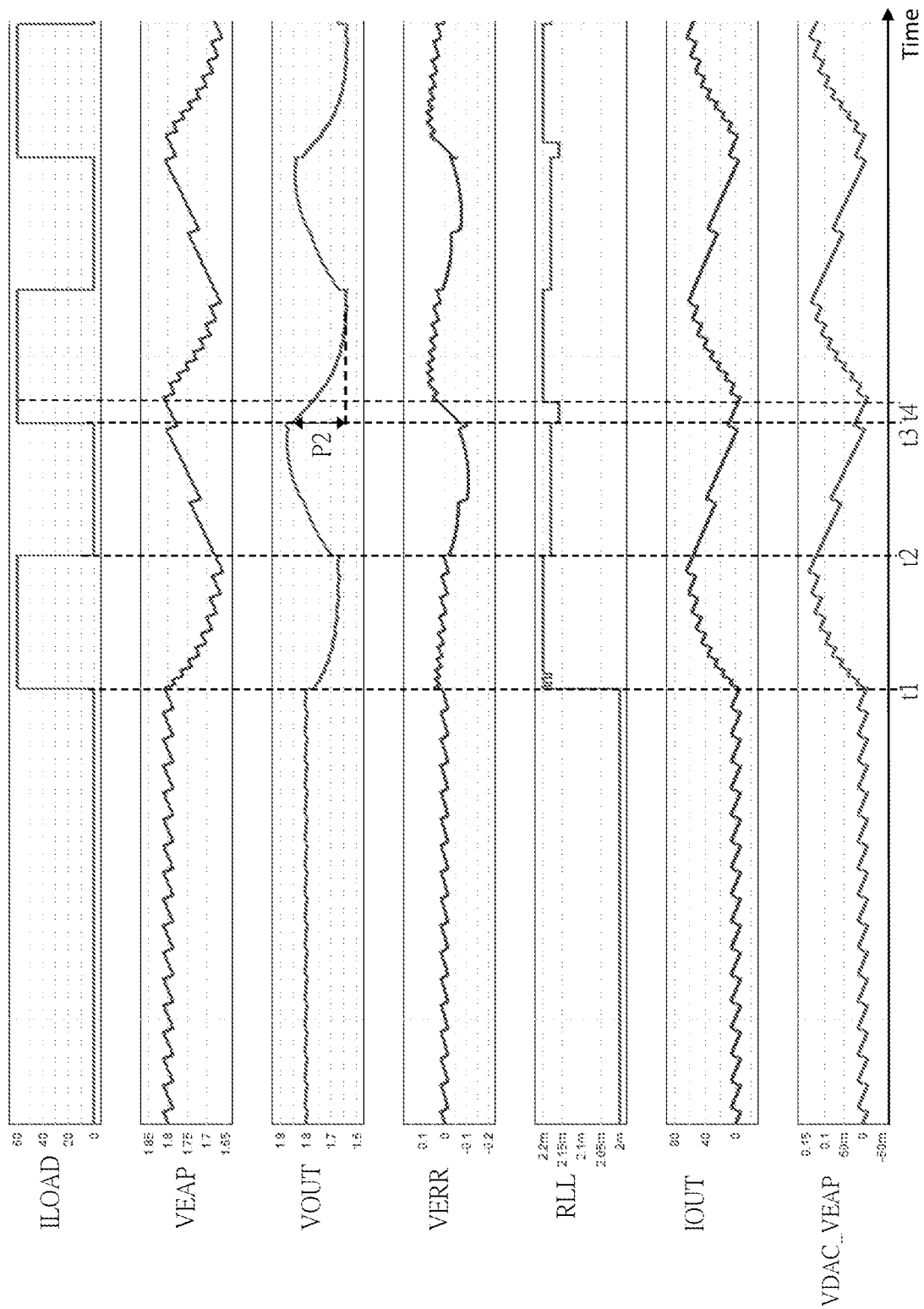

Please refer to FIG. 6 and FIG. 7. FIG. 6 and FIG. 7 are timing diagrams of the control circuit of the power converter of the prior art and the invention in continuous short-time load increasing. The simulation conditions are: the input voltage VIN=6V, the default value M of the load-line RLL=2 mΩ (applicable to 12V), but not limited to this.

As shown in FIG. 6, since the prior art fails to have a reference voltage adjusting mechanism like the invention, no matter whether the load starts to be unloaded or not, the load-line RLL remains unchanged at the default value M=2 mΩ. The reference voltage VEAP and the output current IOUT maintain the same proportional amplitude change, and the peak-to-peak value P1 of the output voltage VOUT is 300 mV.

As shown in FIG. 7, at the time t1, the load starts to draw the load current ILOAD, and the output current IOUT changes from low-level to high-level due to the load drawing. At this time, the output voltage VOUT starts to drop due to the load drawing, and the reference voltage VEAP responds to the droop mechanism and drops to a default voltage value according to the default value M=2 mΩ of the load-line RLL. At this time, because the drop of the output voltage VOUT is large, the difference (that is, the error amplification signal VERR) between the reference voltage VEAP and the output feedback voltage VFB (related to the output voltage VOUT) is increased, resulting in that the error amplification signal VERR increases and is greater than the threshold value VTH. Therefore, the load-line RLL will increase from the original default value M to the adjusted value (M+N)=2.2 mΩ, thereby reducing the reference voltage VEAP to a lower level.

At the time t2, the load is unloaded, and the output current IOUT changes from high-level to low-level due to unloading. The power supply during the unloading period causes the originally dropped output voltage VOUT to start to rise, and the difference (that is, the error amplification signal VERR) between the reference voltage VEAP and the output feedback voltage VFB (related to the output voltage VOUT) becomes smaller and smaller than zero. At this time, if the error amplification signal VERR is less than the threshold value VTH, the load-line RLL will be reduced by 1 unit from the adjusted value (M+N)=2.2 mΩ, and will not directly fall back to the default value M immediately.

At the time t3, the load draws the load current ILOAD again, and the output current IOUT changes from low-level to high-level due to the load drawing. At this time, the output voltage VOUT begins to drop due to the drawing, but at this time the difference (that is, the error amplification signal VERR) between the reference voltage VEAP and the output feedback voltage VFB (related to the output voltage VOUT) has not yet risen to 0, so the error amplification signal VERR is still less than the threshold value VTH, and the load-line RLL will decrease by 1 unit again.

At the time t4, the output voltage VOUT continues to decrease due to the load increasing, so that the difference (that is, the error amplification signal VERR) between the reference voltage VEAP and the output feedback voltage VFB (related to the output voltage VOUT) increases and exceeds the threshold value VTH, so the load-line RLL will increase to the adjusted value (M+N)=2.2 mΩ. This means that the reference voltage VEAP is adaptively adjusted due to the change in the ratio of the output current IOUT, and the peak-to-peak value P2 of the output voltage VOUT is 230 mV.

It should be noted that, after comparing FIG. 6 and FIG. 7, it can be seen that because the load-line RLL shown in FIG. 7 is raised during load increasing, the error amplification signal VERR is small, and the peak-to-peak value P2 (230 mV) of the output voltage is smaller than that the peak-to-peak value P1 (300 mV) of the output voltage shown in FIG. 6. In other words, compared with the prior art, the control circuit of the power converter proposed in the invention can effectively reduce the peak-to-peak value of the output voltage VOUT during continuous increasing and decreasing by dynamically adjusting the reference voltage VEAP, thereby providing a more stable output.

Figure 8:
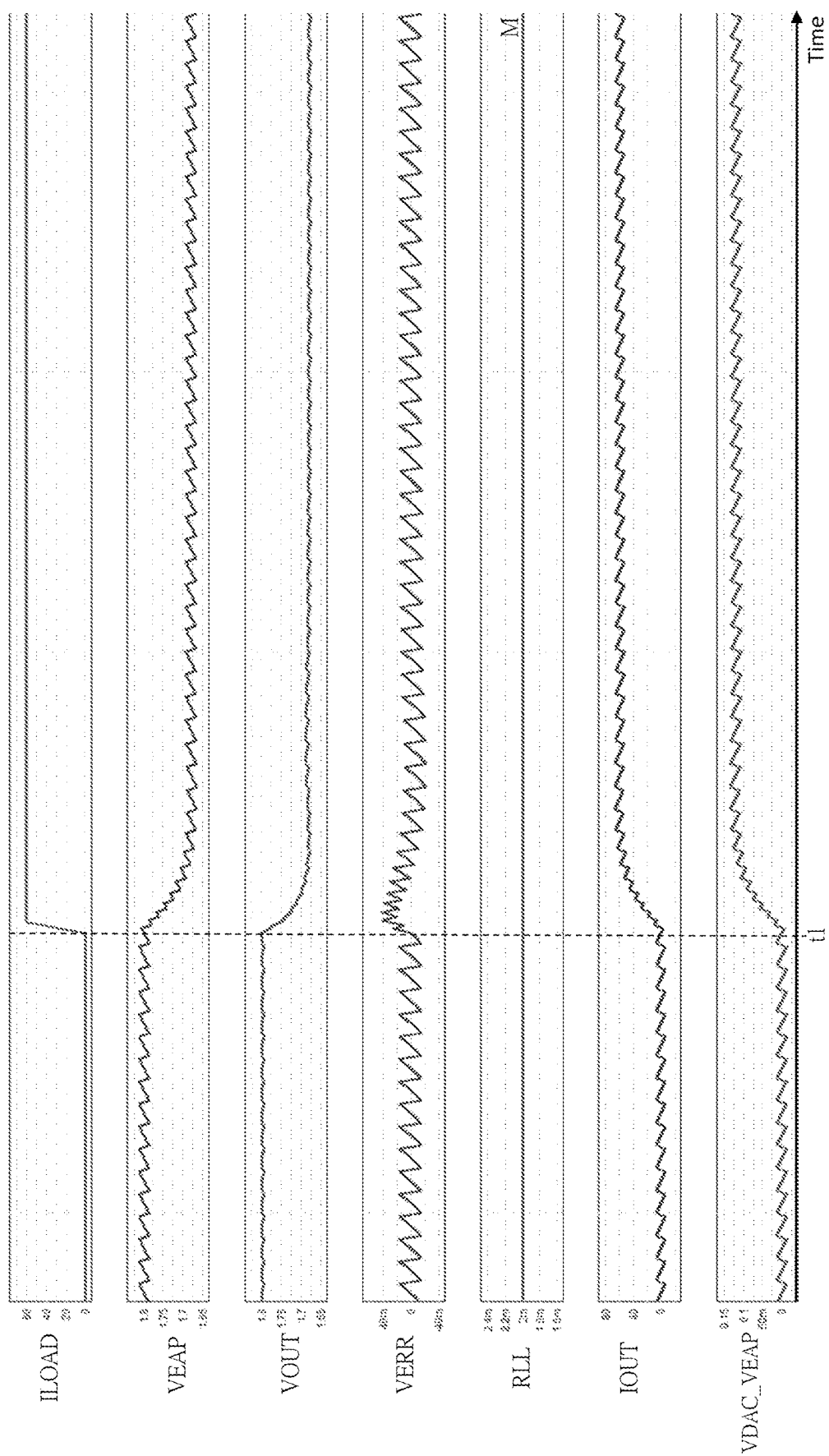
FIG. 8 and FIG. 9 are timing diagrams of the control circuit of the power converter of the prior art and the invention during long-time load increasing and unloading respectively.
Figure 9:
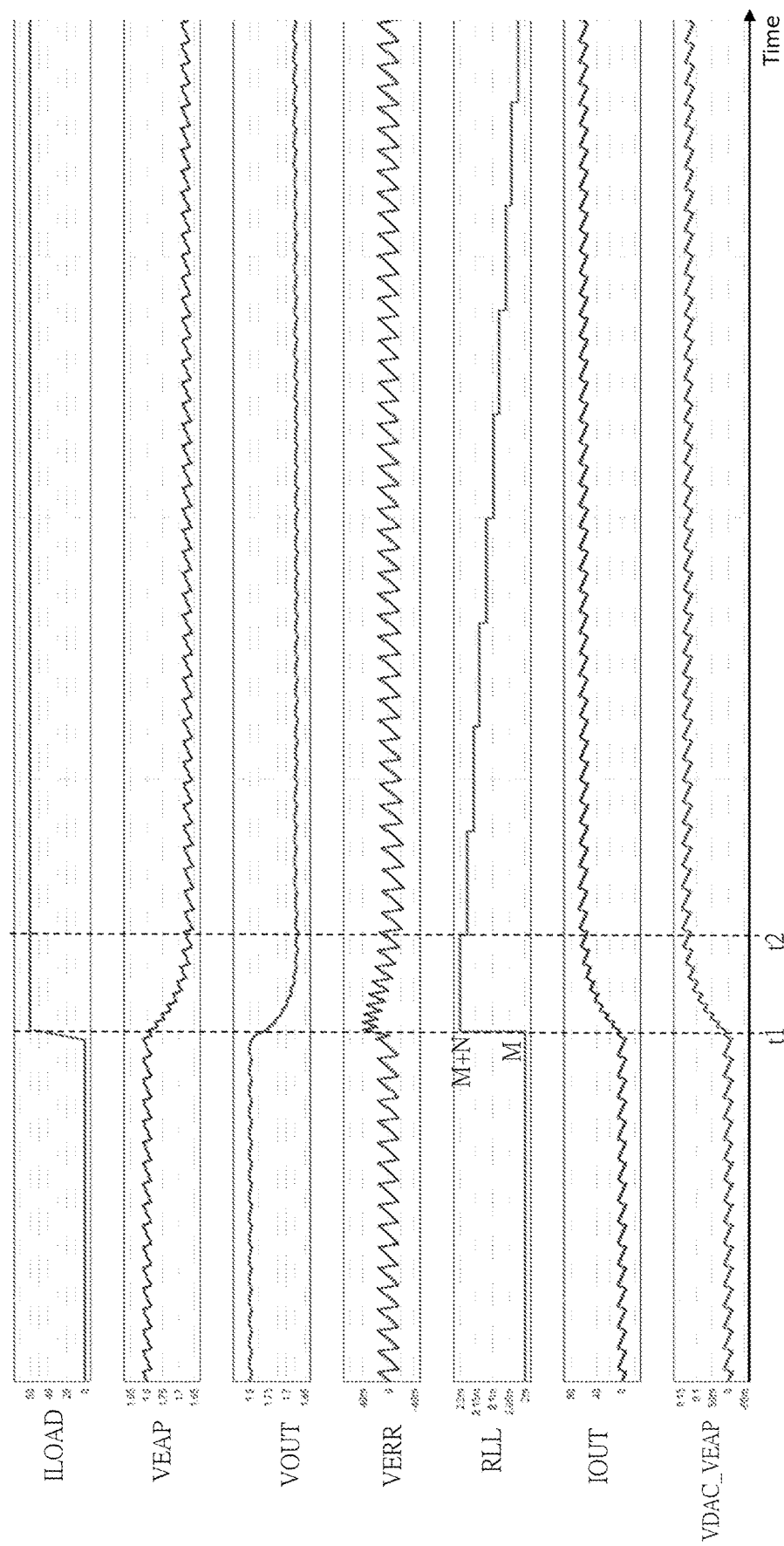

Please refer to FIG. 8 and FIG. 9. FIG. 8 and FIG. 9 are timing diagrams of the control circuit of the power converter of the prior art and the invention during long-time load increasing and decreasing respectively.

As shown in FIG. 8, since the prior art does not have the same reference voltage adjusting mechanism as the invention, when the control circuit of the power converter in prior art is increased for a long time, the load-line RLL will be maintained at the default value. The value M=2 mΩ remains unchanged.

As shown in FIG. 9, at the time t1, the load just begins to increase the load current ILOAD, the load-line RLL will increase from the original default value M to the adjusted value (M+N), and then under long-term load increasing, the load-line RLL will gradually restore to the default value M as the system enters a steady state. Therefore, the performance of the control circuit of the power converter in the prior art and the invention under long-term load increasing are generally similar.

Another embodiment of the invention is a reference voltage adjusting method. In this embodiment, the reference voltage adjusting method is applied to the control circuit of the power converter. The control circuit is coupled to the first output circuit.

Figure 10:
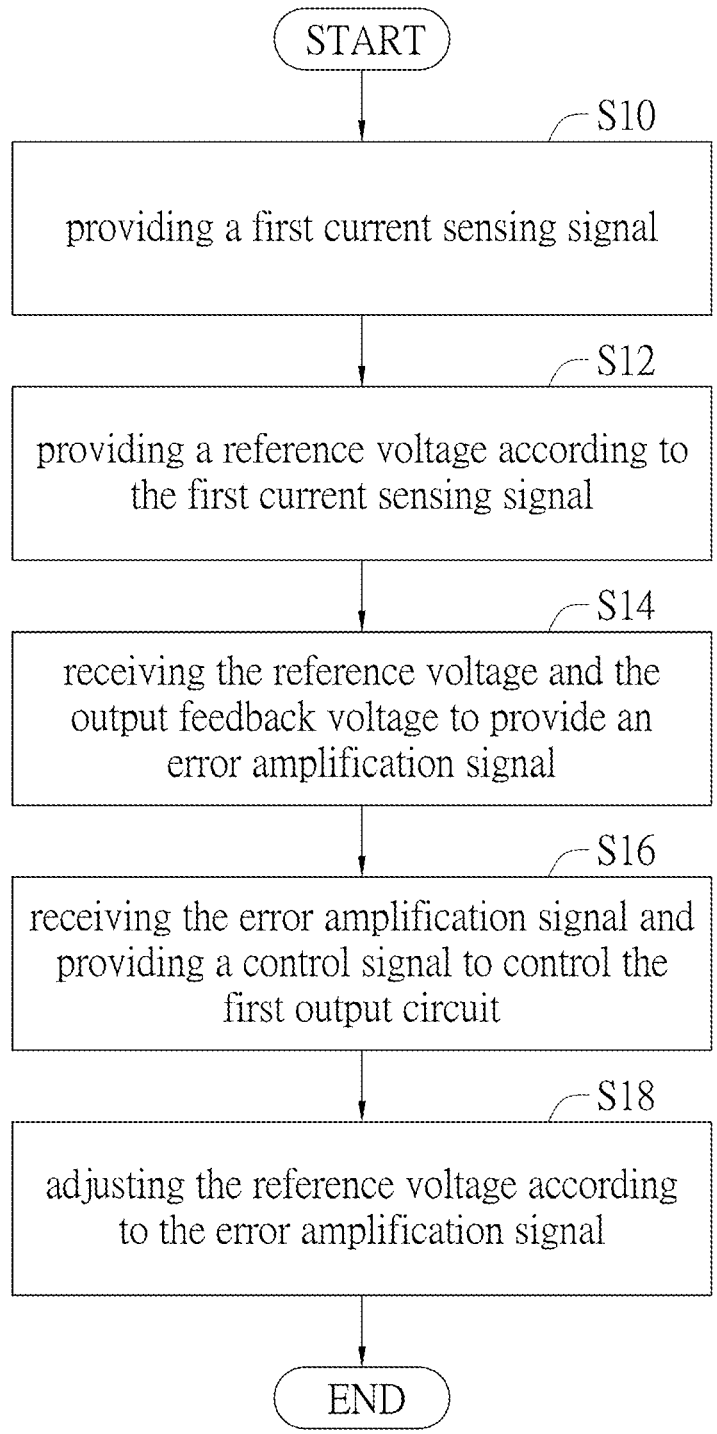
FIG. 10 is a flowchart of a reference voltage adjusting method in another embodiment of the invention.

Please refer to FIG. 10. FIG. 10 is a flowchart of the reference voltage adjusting method in this embodiment. As shown in FIG. 10, the reference voltage adjusting method includes the following steps:

Step S10: providing a first current sensing signal;

Step S12: providing a reference voltage according to the first current sensing signal;

Step S14: receiving the reference voltage and the output feedback voltage to provide an error amplification signal;

Step S16: receiving the error amplification signal and providing a control signal to control the first output circuit; and Step S18: adjusting the reference voltage according to the error amplification signal.

In an analog application, the step S18 adjusts the scaling ratio of the sensing current (load-line RLL) to change the variation of the reference voltage to achieve the purpose of adjusting the reference voltage, but not limited to this. When a load increasing behavior occurs at the load coupled to the power converter, the step S18 is to increase the scaling ratio of the sensed current according to the error amplification signal and change the scaling ratio from the default value M to the adjusted value (M+N). When the load coupled to the power converter is stable, the reference voltage adjusting method will gradually restore the scaling ratio from the adjusted value (M+N) to the default value (M).

In one embodiment, the step S10 further includes providing a second current sensing signal, and the step S12 further includes generating a reference voltage according to the first current sensing signal and the second current sensing signal, but not limited to this.

If the control circuit of the power converter is digital type, then the reference voltage adjusting method further includes: converting the first current sensing signal into a digital sensing value, and generating a digital reference value representing the reference voltage according to the digital sensing value; and selectively changing the ratio (load-line RLL) of the variation of the digital reference value to the output current from the default value to the adjusted value according to whether the error amplification signal is higher than the threshold value, and generating a digital reference value according to the relationship that the variation of the digital reference value=the output current*load-line.

Compared to the prior art, the control circuit of the power converter and the reference voltage adjusting method thereof in the invention first determine whether the default load-line is sufficient according to the error amplification signal when load increasing occurs, and when the default reference voltage variation is not enough (that is, when the error amplification signal is greater than the threshold value), the value of the load-line is increased to increase the amount of reference voltage variation and is then gradually adjusted back to the default load-line according to the comparing result of the error amplification signal and the threshold value. The control circuit of the power converter and the reference voltage adjusting method thereof have the following advantages/functions:

(1) The reference voltage variation can be adjusted appropriately according to the input voltage and load current to reduce the peak-to-peak difference of the output voltage during fast load increasing and unloading under different input voltage applications, so it can effectively improve the output stability.

(2) The reference voltage variation can gradually restore to the default value after the load increasing and unloading is completed without affecting the output voltage of the long-term load increasing.

What is claimed is:

1. A control circuit of a power converter, coupled to a first output circuit, the control circuit comprising:
   a first sensing circuit, coupled to the first output circuit and configured to provide a first current sensing signal;
   a reference voltage generation circuit, coupled to the first sensing circuit and configured to provide a reference voltage according to the first current sensing signal;
   an error amplifying circuit, coupled to the reference voltage generation circuit and configured to receive the reference voltage and an output feedback voltage of the power converter to provide an error amplifying signal; and
   a PWM circuit, coupled between the error amplifying circuit and the first output circuit and configured to receive the error amplifying signal and provide a control signal to control the first output circuit,
   wherein the reference voltage generation circuit further receives the error amplifying signal and adjusts the reference voltage that the reference voltage generation circuit generates according to the error amplifying signal.

2. The control circuit of claim 1, wherein the reference voltage generation circuit further comprises a comparing circuit coupled to the error amplifying circuit and configured to compare the error amplifying signal with a threshold value to generate a comparing result.

3. The control circuit of claim 1, wherein when a load coupled to the power converter is increased, the reference voltage generation circuit changes a ratio between the reference voltage and an output current provided by the output circuit from a default value to an adjusted value according to the error amplification signal.

4. The control circuit of claim 3, wherein when the load coupled to the power converter is stable, the reference voltage generation circuit gradually restores the ratio from the adjusted value to the default value.

5. The control circuit of claim 3, wherein the adjusted value is related to an input voltage of the power converter.

6. The control circuit of claim 1, wherein the reference voltage generation circuit comprises an adjusting circuit and a voltage generation circuit, the adjusting circuit is coupled to the first sensing circuit and an output terminal of the error amplifying circuit respectively, and the voltage generation circuit is coupled to the adjusting circuit and an input terminal of the error amplifying circuit respectively and generates the reference voltage.

7. The control circuit of claim 6, wherein the adjusting circuit comprises a comparing circuit and a bidirectional counting circuit, an input terminal of the comparing circuit is coupled to the output terminal of the error amplifying circuit, the bidirectional counting circuit is coupled to an output terminal of the comparing circuit and determines and adjusts a variation of the reference voltage according to a comparing signal provided by the comparing circuit.

8. The control circuit of claim 1, wherein the reference voltage generation circuit comprises an analog-digital converting circuit and a digital voltage generation circuit, the analog-digital converting circuit is coupled to the first sensing circuit, and the digital voltage generation circuit is coupled between the analog-digital converting circuit and the error amplifying circuit, the analog-digital converting circuit converts the first current sensing signal into a digital sensing value, and the digital voltage generation circuit generates a digital reference value representing the reference voltage according to the digital sensing value.

9. The control circuit of claim 8, wherein the digital voltage generation circuit selectively changes a variation of the digital reference value from a default value to an adjusted value according to whether the error amplification signal is higher than a threshold value.

10. The control circuit of claim 1, wherein the control circuit is further coupled to a second output circuit, the control circuit further comprises:
    a second sensing circuit, coupled between the second output circuit and the reference voltage generation circuit and configured to provide a second current sensing signal to the reference voltage generation circuit, the reference voltage generation circuit generates the reference voltage according to the first current sensing signal and the second current sensing signal.

11. A reference voltage adjusting method, applied to a control circuit of a power converter, the control circuit being coupled to a first output circuit, the control circuit comprising a reference voltage generation circuit, the reference voltage adjusting method comprising steps of:
    (a) providing a first current sensing signal;
    (b) the reference voltage generation circuit providing a reference voltage according to the first current sensing signal;
    (c) receiving the reference voltage and an output feedback voltage to provide an error amplifying signal;

(d) receiving the error amplifying signal and providing a control signal to control the first output circuit; and (e) the reference voltage generation circuit further receiving the error amplifying signal and adjusting the reference voltage that the reference voltage generation circuit generates according to the error amplifying signal.

12. The reference voltage adjusting method of claim 11, further comprising step of:

(f) comparing the error amplifying signal and a threshold value to generate a comparing result.

13. The reference voltage adjusting method of claim 11, wherein when a load coupled to the power converter is increased, the reference voltage adjusting method changes a variation of the reference voltage from a default value to an adjusted value according to the error amplification signal.

14. The reference voltage adjusting method of claim 13, wherein when the load coupled to the power converter is stable, the reference voltage adjusting method gradually restores the ratio from the adjusted value to the default value.

15. The reference voltage adjusting method of claim 13, wherein the adjusted value is related to an input voltage of the power converter.

16. The reference voltage adjusting method of claim 11, further comprising:

converting the first current sensing signal into a digital sensing value, and generating a digital reference value representing the reference voltage according to the digital sensing value.

17. The reference voltage adjusting method of claim 11, further comprising:

selectively changing a variation of the digital reference value from a default value to an adjusted value according to whether the error amplification signal is higher than a threshold value.

18. The reference voltage adjusting method of claim 11, wherein the step (a) further comprises: providing a second current sensing signal and the step (b) further comprises: generating the reference voltage according to the first current sensing signal and the second current sensing signal.

* * * * *